(12) United States Patent
Feng et al.

(10) Patent No.: US 8,195,338 B2
(45) Date of Patent: Jun. 5, 2012

(54) REACTIVE POWER OPTIMIZATION

(75) Inventors: Xiaoming Feng, Cary, NC (US);
Maddumage Gamini Wickramasekara, Raleigh, NC (US);
William Peterson, Cary, NC (US)

(73) Assignee: ABB Research Ltd., Zurich (CH)

( * ) Notice: Subject to any disclaimer, the term of this patent is extended or adjusted under 35 U.S.C. 154(b) by 406 days.

(21) Appl. No.: 12/613,314

(22) Filed: Nov. 5, 2009

(65) Prior Publication Data

US 2010/0114398 A1    May 6, 2010

Related U.S. Application Data

(60) Provisional application No. 61/111,591, filed on Nov. 5, 2008.

(51) Int. Cl.
*G05D 11/00* (2006.01)

(52) U.S. Cl. .......... 700/286; 700/291; 700/294; 702/60; 702/63

(58) Field of Classification Search .................. 700/286, 700/287, 288, 291, 293, 295, 297; 702/60–63
See application file for complete search history.

(56) References Cited

U.S. PATENT DOCUMENTS

| 4,365,190 | A | 12/1982 | Pasternack et al. |
| 6,202,041 | B1 | 3/2001 | Tse et al. |
| 6,549,880 | B1 | 4/2003 | Willoughby et al. |
| 2006/0229767 | A1 | 10/2006 | Chu et al. |
| 2010/0256970 | A1* | 10/2010 | Heese et al. .................... 703/18 |

FOREIGN PATENT DOCUMENTS

| WO | 2006121893 | 11/2006 |
| WO | 2008025162 | 3/2008 |
| WO | 2010054091 | 5/2010 |

* cited by examiner

*Primary Examiner* — Kakali Chaki
*Assistant Examiner* — Nathan Laughlin
(74) *Attorney, Agent, or Firm* — Paul R. Katterle; Michael C. Prewitt

(57) ABSTRACT

Var optimization (VARO) is a subsystem of a voltage and var optimization (VVO) system that processes a capacitor switching optimization problem. The VARO is a self contained process that may work stand alone or in conjunction with a Voltage Regulation Optimization (VRO) system to provide integrated VVO solutions. The VARO system takes network inputs and calculates optimal settings for distribution network capacitor banks.

4 Claims, 4 Drawing Sheets

REACTIVE POWER OPTIMIZATION

This application claims priority to application Ser. No. 61/111,591 filed on Nov. 5, 2008, the contents of which are incorporated in their entirety.

BACKGROUND

In electricity distribution systems, loss occurs when current flows through the conductors in the system. This energy loss through a conductor may be calculated according to $I^2R$, where I is the current through conductor whose resistance is R. The net demand or current flow depends on the voltage profile on the feeders. Reactive compensation can reduce unnecessary current flows and in turn reduce losses. Voltage regulation affects the effective loading of feeders, as well as the energy losses.

Voltage and Var optimization (VVO) systems are employed in electricity distribution systems to optimize the distribution of voltages and currents on distribution systems. VVO systems endeavor to maximize efficiency of energy delivery by controlling the tap changer settings of voltage regulating transformers (Voltage) and reactive power resources (capacitor banks) (Var) by employing online system models and demand forecasts.

With reference to FIG. 1, an electricity distribution network is shown. As can be seen, a substation provides power to a plurality of loads through the substation transformers, feeders, and laterals. Distributed at various points in the distribution network are capacitor banks C that may be fixed or switched, and voltage regulators that can be locally or remotely controlled to alter the tap settings. The connectivity of the network and the status of the various equipment, such as transformers, loads, capacitors, voltage regulators, are monitored via sensors and a communication infrastructure. Monitored data may include voltage, current and/or power at or through various points or conductors. This information is transmitted to a distribution management system (DMS) or a substation automation system (SAS). Upon receiving the updated status information, the system model (load flow model) within the DMS is updated. A load forecast is performed based on the SCADA data, customer billing data, and/or data collected from advanced metering infrastructure (AMI). The VVO, based on the load forecasts, the system model, and the available control information, then determines the best tap settings for the voltage regulators and on load tap change (OLTC) transformers, and the Var resources such as switched shunt capacitors or reactors. Control commands are then transmitted back to the various elements in the distribution grid where the control actions are carried out, bring the system to a more efficient operating state.

VVO is the decision making process that analyzes the input data from the field and generates the control signals to be transmitted to the controllers in the filed. Var optimization (VARO) is a subsystem of a VVO system that processes the capacitor switching optimization problem. The VARO is a self contained process that may work stand alone or in conjunction with a Voltage Regulation Optimization (VRO) system to provide integrated VVO solutions. The present disclosure is directed toward a design for VAR optimization.

The concept of optimizing energy delivery efficiency on electric distribution systems by means of capacitor bank switching dates back several decades and many in the industry and the research communities have attempted to develop effective solution methodology and process. Most solution approaches proposed to date are applicable to small, very simplified academic models, and are not suitable for large scale, meshed, multi-source, multi-phase unbalanced distribution systems that are common in real-world distribution networks. The deficiencies in conventional methods are due to (1) the model being too simplified to represent a real system, by assuming radial topology, balanced construction and operation, or ignoring the effect of transformer connections (for example, wye to delta connections), (2) the computation efficiency being so low that the solution can not be scaled for either online or offline applications for large system, or (3) the methods are not general enough and have limited optimizing capability Thus, there is a need in the art for an optimization solution applicable to large scale, meshed, multi-source, multi-phase unbalanced distribution systems.

SUMMARY OF THE INVENTION

According to one aspect of the present invention a computer program product is provided for determining optimal capacitor bank switching in a distribution network. The product includes a computer readable medium having computer readable code embedded therein, the computer readable medium includes program instructions that receive a network model and builds a set of controls $S^c$ and a set of conductors $S^b$ in the network model; program instructions that solve a base case unbalanced load flow for a base network; program instructions that determine initial current values $I_i^d(0), I_i^q(0)$ for each conductor $S^b$ in a base case; program instructions that initialize the load flow model to an initial case and, for each control in $S^c$; program instructions that perturbs the capacitor status for each control in $S^c$ and determines a new load flow for the model with the perturbed capacitor status; program instructions that calculate new currents $I_i^d, I_i^q$ for each conductor in $S^b$ using the new load flow and determine current sensitivity vectors $S^d$, $S^q$ according to $\Delta I_i^d = I_i^d - I_i^d(0)$, $\Delta I_i^q = I_i^q - I_i^q(0)$; program instructions that constructs, using the initial load flow solution and the current sensitivity vectors $S^d$, $S^q$, a MIQCQP; program instructions that solve said MIQCQP to output optimal control settings for $S^c$; and program instructions that output said optimal control settings.

BRIEF DESCRIPTION OF THE DRAWING FIGURES

DETAILED DESCRIPTION OF THE INVENTION

The purpose of the VARO is to find the optimal integer solution for switchable capacitor/reactor banks so as to minimize the energy loss on a distribution circuit, under an assumed load forecast condition. In the following disclosure, the voltage regulation controls, i.e. adjustable taps of voltage regulating transformers are assumed to be fixed because they are optimized by a separate voltage regulation optimization subsystem.

State variables are the phase specific (phase A, B or C) voltages at every node of the system in either polar or rectangular coordinates. The state variable vector is designated by x. The control variables for VARO are the ganged (all three phases operate in unison) or un-ganged (each phase has its own control) control of each capacitor/reactor bank. The control variable vector is designated by u.

The purpose of the VARO is to minimize an objective function that is the real energy loss on the distribution circuit.

The energy loss is a function of the state variables, which in turn depend on the control variables through the power flow equations.

The energy loss function is expressed in rectangular form as:

$$f(x, u) = \sum_{i \in S^b} r_i \left( (I_i^d)^2 + (I_i^q)^2 \right),$$

where $S^b$ is the set of all conductors in the distribution circuit with multi phase representation, which include:
 conductor in each phase present (line or transformers)
 neutral conductor
 earth return and grounding conductor
i is the index of a conductor in $S^b$;
$r_i$ is the resistance of the i-th conductor in $S^b$;
$I_i^d$ is the real part of the complex current through i-th conductor
$I_i^q$ is the imaginary part of the complex current through i-th conductor Current constraints are present for current flowing through each conductor in cables, overhead lines, transformers, earth return, and grounding resistance, if applicable. The current flowing through a conductor must be within user specified maximum. Each current constraint is in the quadratic form:

$$(I_i^d)^2 + (I_i^q)^2 \leq (I_i^{max})^2$$

Constraints on control variables for every independent control include limit and integrality constraints. The control solution must be integer since the capacitor banks can not be switched in fractional bank.

$$u^{lb} \leq u \leq u^{ub}$$

$$u \in \mathbb{Z}^n$$

Other constraints like those above, such as the allowable change from a tap's current position, can be easily incorporated into the problem without affecting the design of the solution process.

Figure 1:
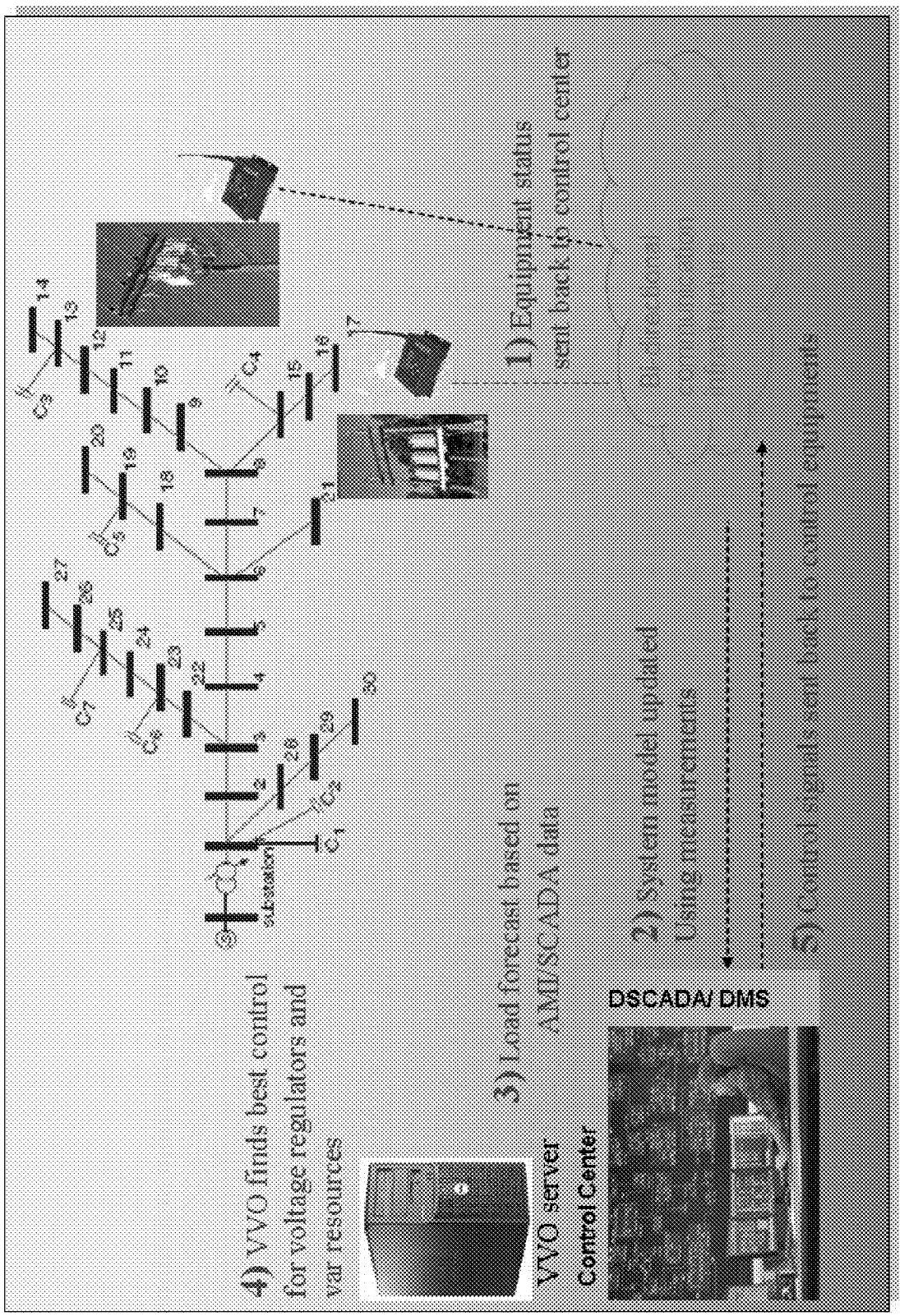
FIG. 1 is a partially schematic view of an electrical distribution system employing a DMS system.
Figure 2:
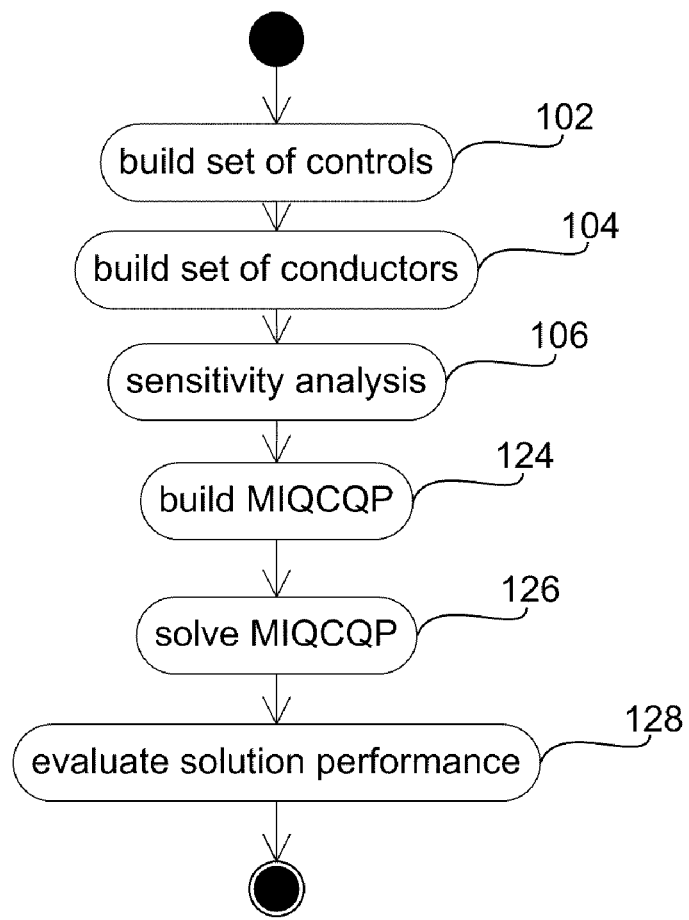
FIG. 2 is a flow chart showing the Var regulation optimization process overview.

With reference now to FIG. 2, an overview of the method according to the present invention is shown. At 102 the system model (unbalanced multi-phase representation of load flow model) is received from the distribution management system or substation automation system and is scanned/examined to identify all independent var controls (either ganged or unganged), information regarding control range, bank size, connection information are collected. The scan produces a set $S^c$ of all independent var controls. For example, if the system under optimization has two capacitor banks, one has three phases (A, B, and C) with ganged control and another with two phases (A, C) with un-ganged controls, the control set will have three control variables, where one control variable is the three phase ganged control, another control variable for phase A of the second capacitor bank, and one more control variable for phase C of the second capacitor bank.

At 104, the system model (unbalanced multi-phase representation of load flow model) is also scanned to identify all conductors through which current flows and resistive loss may occur. The conductors include conductors in each phase of cables, overhead lines, transformers, neutral wires, grounding resistance, and earth returns. Information regarding conductor resistance $r_i$ and current limit $I_i^{max}$ are collected. The set of conductors is denoted by $S^b$. For example, if the system under optimization has three line sections each having all three phases present, the conductor set will have total of nine conductors.

Figure 3:
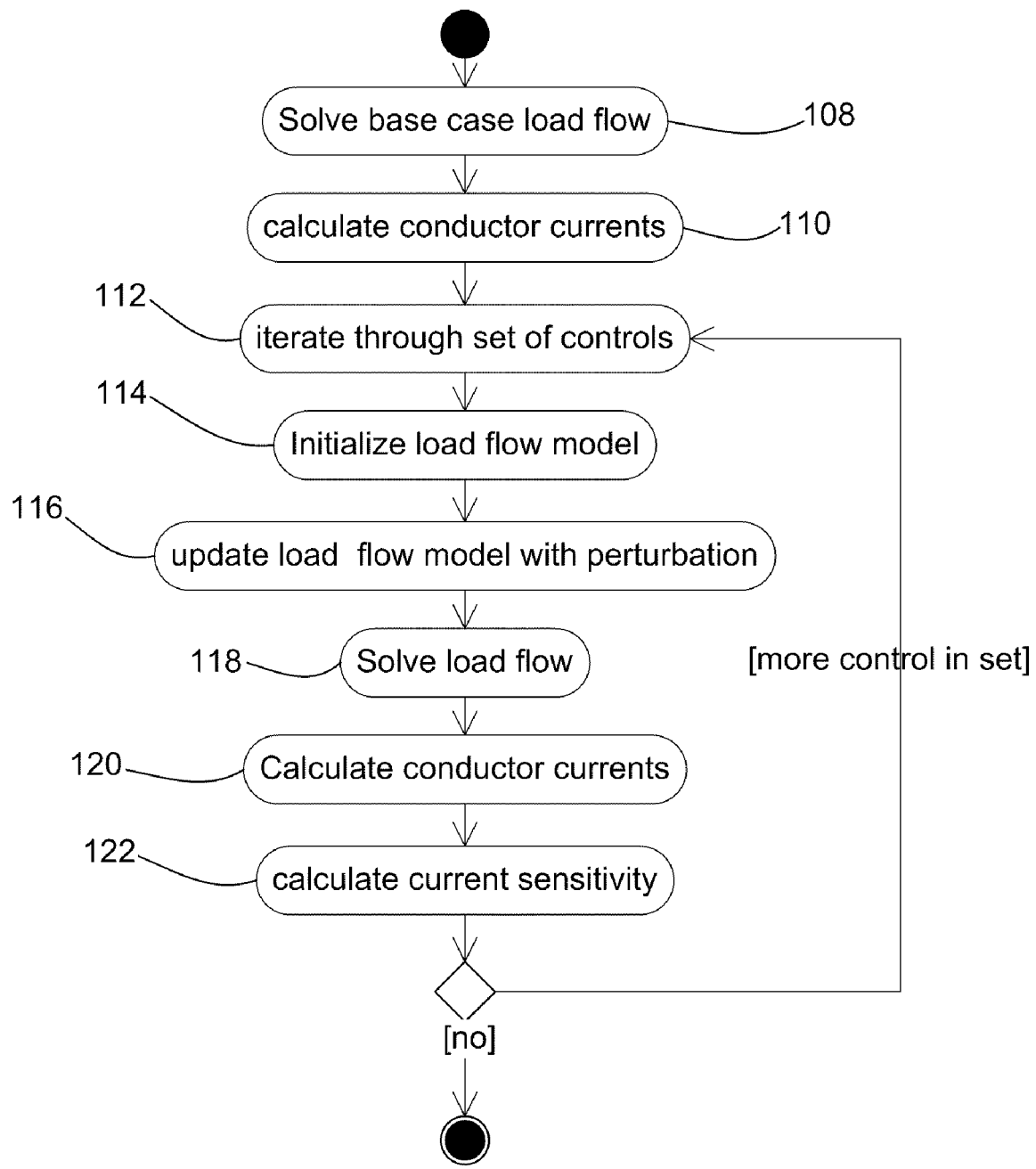
FIG. 3 is a flow chart showing a detailed view of the sensitivity analysis steps of the VARO process.

At 106 a current sensitivity analysis is performed. With reference to FIG. 3, a more detailed view of the current sensitivity analysis is shown. At 108 the unbalanced load flow is solved for the base case, where the capacitor banks are left at their initial settings u(0) (on or off). At 110 the initial current values $I_i^d(0)$, $I_i^q(0)$ for each conductor in $S^b$ are calculated, which usually are not calculated by a load flow program by default. At 112, an iteration is done over the element of the control set.

For each control in $S^c$, at 114 the load flow model is initialized (restored) to the base case. At 116, the load flow model is updated with a unit bank perturbation (turning one bank on or off). If a capacitor bank's initial status is off, the perturbation is to turn it on, otherwise, the perturbation is to turn it off. At 118 the load flow is resolved for the perturbed case. At 120 the conductor currents $I_i^d, I_i^q$ are calculated for each element in the conductor set. At 122 changes in current for each element in the conductor set between the base case and the perturbation case are calculated according to, $$\Delta I_i^d = I_i^d - I_i^d(0),$$

$$\Delta I_i^q = I_i^q - I_i^q(0),$$

which are the sensitivity of conductor currents in response to the var control when normalized by the perturbation size. Fractional perturbation (turning only a portion of a bank on or off, in simulation) can also be used without significant effect on the results. The sensitivity values of the conductor currents to unit bank switching of var are denoted by $S^d, S^q$, which will be used in the main process for building the optimization problem.

With reference again to FIG. 2, from the output of current sensitivity analysis and the initial load flow solution, a mixed integer quadratically constrained quadratic optimization problem (MIQCQP) can be constructed at 124. The control variables are restricted to integer solutions and the MIQCQP is illustrated below.

$$\min \sum_{i \in S^b} r_i \left( (I_i^d)^2 + (I_i^q)^2 \right)$$

$$\text{s.t.} \quad (I_i^d)^2 + (I_i^q)^2 \leq (I_i^{max})^2, \quad \forall i \in S^b$$

$$I^d - S_i^d(u - u(0)) = I^d(0), \quad \forall i \in S^b$$

$$I^q - S_i^q(u - u(0)) = I^q(0), \quad \forall i \in S^b$$

$$u^{lb} \leq u \leq u^{ub}$$

$$u \in \mathbb{Z}^n$$

Slack variables can be added to the current limit constraints to reduce violations and assure technical feasibility.

Figure 4:
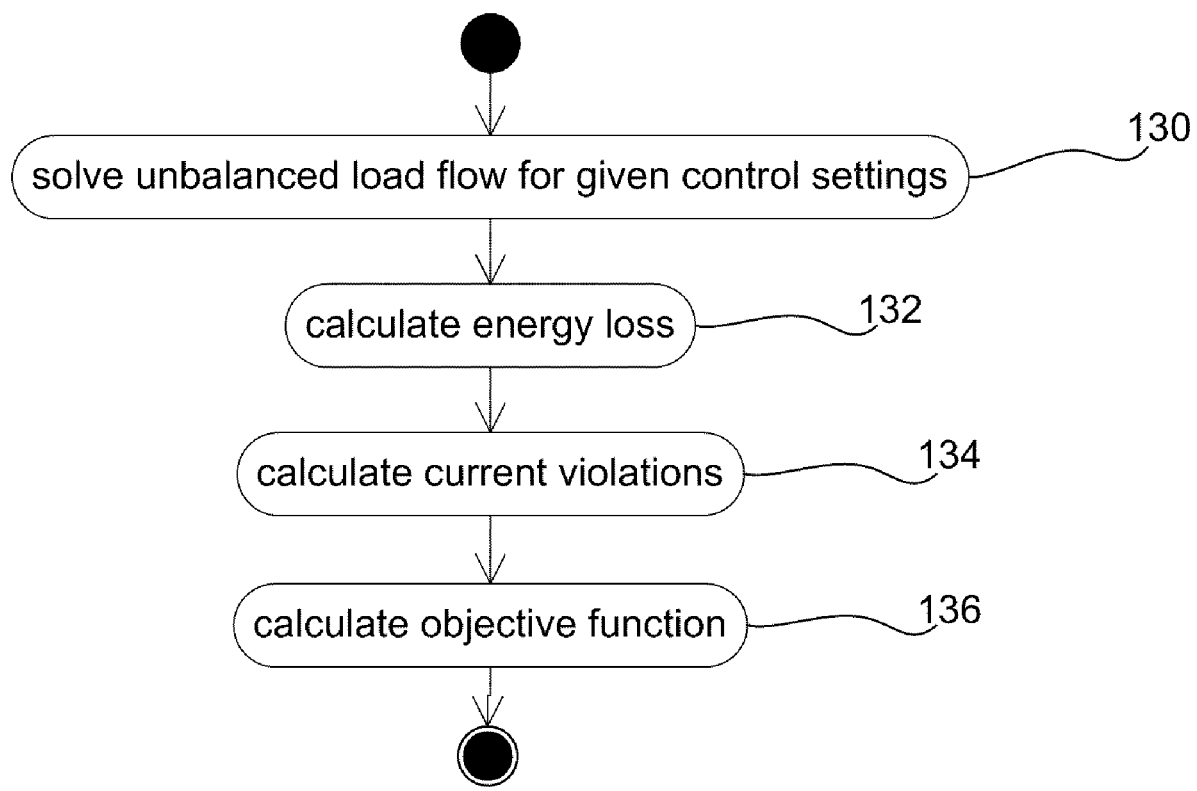
FIG. 4 is a flow chart showing a detailed view of the solution performance evaluation steps of the VARO process.

At 126 the MIQCQP is solved by a general purpose MIP solver to get the optimal var control in integer solution. The output will be the optimal status for each of independently controlled capacitor bank. With the integer var control solution, the solution performance is evaluated at 128. With reference to FIG. 4, a more detailed view of the performance evaluation is shown. At 130, the multi-phase unbalanced load flow is solved with the control variables u set at the solution value from solving the MIQCQP. At 132, the energy loss is calculated for the system. At 134 the conductor currents are calculated to ascertain any current limit violations. At 136 an objective value is calculated as the sum of loss and absolute values of the individual violations weighted by a penalty factor as used in the MIQCQP construction and solution step.

VARO may be repeated a plurality of times before a final solution is arrived at. In practice, however, for most systems and conditions, a single pass yields very good results. When the VARO runs in standalone mode, the solution may be transmitted to the field to carry out the actual switching. When VARO runs as a subsystem of VVO, the solution provides the capacitor status to the system model for which the voltage regulation optimization (VRO) runs.

As can be appreciated by one of ordinary skill in the art, the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a flash drive, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the present invention may be written in an object oriented programming language such as Java, Smalltalk, C++ or the like, or may also be written in conventional procedural programming languages, such as the "C" programming language. The program code may execute entirely in a DMS system, or a separate computer as a stand-alone software package.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

We claim:

1. A computer program product for determining optimal capacitor bank switching in a distribution network, comprising: a non-transitory computer readable medium having computer readable code embedded therein, the computer readable code comprising:
program instructions that receive a network model and builds a set of controls $S^c$ and a set of conductors $S^b$ in the network model;
program instructions that solve a base case unbalanced load flow for a base network;
program instructions that determine initial current values $I_i^d(0)$, $I_i^q(0)$ for each conductor $S^b$ in the base case;
program instructions that initialize the load flow model to an initial case and, for each control in $S^c$;
program instructions that perturbs the capacitor status for each control in $S^c$ and determines a new load flow for the model with the perturbed capacitor status;
program instructions that calculate new currents $I_i^d$, $I_i^q$ for each conductor in $S^b$ using the new load flow and determine current sensitivity vectors $S^d$, $S^q$ according to $\Delta I_i^d = I_i^d - I_i^d(0), \Delta I_i^q = I_i^q - I_i^q(0)$;
program instructions that constructs, using the initial load flow solution and the current sensitivity vectors $S^d$, $S^q$, a mixed integer quadratically constrained quadratic optimization problem (MIQCQP);
program instructions that solve said MIQCQP to output optimal control settings for $S^c$; and
program instructions that output said optimal control settings.

2. The computer program product according to claim 1 wherein said MIQCQP is calculated according to:

$$\min \sum_{i \in S^b} r_i ((I_i^d)^2 + (I_i^q)^2)$$

$$s.t. \quad (I_i^d)^2 + (I_i^q)^2 \leq (I_i^{max})^2, \quad \forall i \in S^b$$
$$I^d - S_i^d(u - u(0)) = I^d(0), \quad \forall i \in S^b$$
$$I^q - S_i^q(u - u(0)) = I^q(0), \quad \forall i \in S^b$$
$$u^{lb} \leq u \leq u^{ub}$$
$$u \in \mathbb{R}^n$$

wherein i=index of a conductor in $S^b$;
$I_i^d$=real part of the complex current through i-th conductor;
$I_i^q$=imaginary part of the complex current through i-th conductor;
$r_i$=resistance of the i-th conductor in $S^b$; $S_i^d$, $S_i^q$=current sensitivity vectors; U =control variable vector; $U^{lb}$=lower bound of the control variable vector; and $U^{ub}$=upper bound of the control variable vector.

3. A method for determining optimal capacitor bank switching in a distribution network, the method comprising:
receiving a network model and builds a set of controls $S^c$ and a set of conductors $S^b$ in the network model;
solving a base case unbalanced load flow for a base network;
determining initial current values $I_i^d(0)$, $I_i^q(0)$ for each conductor $S^b$ in the base case;
initializing the load flow model to an initial case and, for each control in $S^c$;
perturbing the capacitor status for each control in $S^c$ and determines a new load flow for the model with the perturbed capacitor status;
calculating new currents $I_i^d$, $I_i^q$ for each conductor in $S^b$ using the new load flow and determine current sensitivity vectors $S^d$, $S^q$ according to $\Delta I_i^d = I_i^d - I_i^d(0), \Delta I_i^q = I_i^q - I_i^q(0)$;
constructing, using the initial load flow solution and the current sensitivity vectors $S^d$, $S^q$, a mixed integer quadratically constrained quadratic optimization problem (MIQCQP);
solving said MIQCQP to output optimal control settings for $S^c$; and
outputting said optimal control settings.

4. The method according to claim 3 wherein said MIQCQP is calculated according to:

$$\min \sum_{i \in S^b} r_i ((I_i^d)^2 + (I_i^q)^2)$$

$$s.t. \quad (I_i^d)^2 + (I_i^q)^2 \leq (I_i^{max})^2, \quad \forall i \in S^b$$
$$I^d - S_i^d(u - u(0)) = I^d(0), \quad \forall i \in S^b$$
$$I^q - S_i^q(u - u(0)) = I^q(0), \quad \forall i \in S^b$$
$$u^{lb} \leq u \leq u^{ub}$$
$$u \in \mathbb{R}^n$$

wherein i =index of a conductor in $S^b$;
$I_i^d$=real part of the complex current through i-th conductor;
$I_i^q$=imaginary part of the complex current through i-th conductor;
$r_i$=resistance of the i-th conductor in $S^b$;
$S_i^d$, $S_i^q$=current sensitivity vectors;
U=control variable vector;
$U^{lb}$=lower bound of the control variable vector; and
$U_{ub}$=upper bound of the control variable vector.

* * * * *